United States Patent
Tranquilla et al.

(10) Patent No.: US 12,015,183 B2
(45) Date of Patent: Jun. 18, 2024

(54) MICROWAVE MODE COUPLING DEVICE FOR TRANSFERRING EM ENERGY BETWEEN FIRST AND SECOND STRUCTURES THROUGH AN INTERMEDIATE WAVEGUIDE HAVING A PRESSURE BARRIER THEREIN

(71) Applicant: Nuionic Technologies (Canada) Inc., Fredericton (CA)

(72) Inventors: James M. Tranquilla, Fredericton (CA); Kenneth Clark, Fredericton (CA)

(73) Assignee: Nuionic Technologies (Canada) Inc (CA)

( * ) Notice: Subject to any disclaimer, the term of this patent is extended or adjusted under 35 U.S.C. 154(b) by 0 days.

(21) Appl. No.: 18/035,154

(22) PCT Filed: Nov. 4, 2021

(86) PCT No.: PCT/CA2021/051574
§ 371 (c)(1),
(2) Date: May 3, 2023

(87) PCT Pub. No.: WO2022/094716
PCT Pub. Date: May 12, 2022

(65) Prior Publication Data
US 2023/0411813 A1    Dec. 21, 2023

Related U.S. Application Data

(60) Provisional application No. 63/109,711, filed on Nov. 4, 2020.

(51) Int. Cl.
*H01P 1/08* (2006.01)
*H01P 1/16* (2006.01)
(Continued)

(52) U.S. Cl.
CPC .............. *H01P 1/08* (2013.01); *H01P 1/16* (2013.01); *H01P 5/082* (2013.01); *H01P 5/103* (2013.01)

(58) Field of Classification Search
CPC .................................. H01P 1/08; H01P 5/103
(Continued)

(56) References Cited

U.S. PATENT DOCUMENTS 2,958,834 A * 11/1960 Symons et al. ........... H01P 1/08
333/252
3,262,076 A * 7/1966 Uenohara ................. H01P 1/08
333/252
(Continued)

FOREIGN PATENT DOCUMENTS

WO    2018075186    4/2018

OTHER PUBLICATIONS

Giri, DV, "Mode converters for high-power microwaves", 2016 International Conference on Electromagnetics in Advanced Applications (ICEAA); Sep. 19, 2016; pp. 311-314. IEEE.

*Primary Examiner* — Benny T Lee
(74) *Attorney, Agent, or Firm* — Dureska & Moore, LLC; David P. Dureska; Benjamin J. Chojnacki

(57) ABSTRACT

A microwave mode coupling device for transferring electromagnetic (EM) energy from a first structure to a second structure while providing a pressure barrier between the first structure and the second structure, the coupling device comprising first and second transmission line sections separated by an intermediate waveguide section.

18 Claims, 3 Drawing Sheets

(51) Int. Cl.
*H01P 5/08* (2006.01)
*H01P 5/103* (2006.01)

(58) Field of Classification Search
USPC .................................................. 333/252, 26
See application file for complete search history.

(56) References Cited

U.S. PATENT DOCUMENTS

| | | | |
|---|---|---|---|
| 5,765,835 A * | 6/1998 | Johnson | H01P 1/042 |
| | | | 333/248 |
| 5,977,841 A * | 11/1999 | Lee | H01P 1/045 |
| | | | 333/260 |
| 8,963,790 B2 | 2/2015 | Brown | |
| 2018/0010949 A1* | 1/2018 | Ohlsson et al. | H01P 5/103 |
| 2019/0207285 A1 | 7/2019 | Hofherr et al. | |

\* cited by examiner

MICROWAVE MODE COUPLING DEVICE FOR TRANSFERRING EM ENERGY BETWEEN FIRST AND SECOND STRUCTURES THROUGH AN INTERMEDIATE WAVEGUIDE HAVING A PRESSURE BARRIER THEREIN

CROSS-REFERENCE TO RELATED APPLICATIONS

This application claims the benefit and priority of PCT Application Serial No. PCT/CA2021/051574 filed Nov. 4, 2021, which claims the benefit and priority of U.S. Provisional Patent Application No. 63/109,711, filed Nov. 4, 2020, entitled "MICROWAVE MODE TRANSFORMER", the contents of which are incorporated herein by reference.

FIELD

This disclosure is directed to microwave mode conversion devices and methods.

BACKGROUND

The coupling of microwave energy between a waveguide and a cylindrical structure that defines an internal cavity has long been practiced and well understood. The primary coupling mechanisms include (i) aperture coupling, and (ii) probe coupling. Included in the types of probe coupling are loop and electrode coupling techniques.

Certain applications, in which the cylindrical structure operates as a reactor containment vessel, require that the reactor operate under substantial positive pressure with respect to the waveguide atmosphere, in which case the use of aperture coupling is precluded due to the inability of available aperture materials to meet relevant pressure vessel codes. This limits the choice of coupling mechanism to probe coupling.

For certain applications, for example such as packed and fluidized beds, the desired configuration of the reactor vessel (also known as an "applicator vessel") and a probe assembly includes a single coaxial electrode passing from the waveguide axially through part of or all of the cylindrical structure. An intermediate coaxial transmission structure is included at the junction between the waveguide and the cylindrical structure that forms the reactor vessel in order to provide a material and pressure seal between the waveguide and the cylindrical structure. The intermediate coaxial transmission structure includes an intermediate portion of the electrode that is surrounded by an outer conductive shell. A solid dielectric barrier is located between the electrode and the outer conductive shell to provide a material and pressure barrier. In order to provide a sufficient seal throughout a range of temperatures (including the temperature differential resulting from the different temperatures of the waveguide and the cylindrical structure), seals are also required between the dielectric barrier and each of the central electrode and surrounding outer conductive shield. A first seal is located between the dielectric barrier and the central electrode, and a second seal is located between the dielectric barrier and the outer conductive shield.

If the reactor vessel is operated at temperatures far below the melting point of the dielectric material, one common means of effecting the first and second seals is by the use of embedded O-rings. If, however, the reactor vessel operates at temperature approaches the melting point of either the dielectric or the O-ring material, then another sealing mechanism must be used.

A further complication arises when the axial electrode extends the entire length of the reactor vessel and is secured to the bottom plate of the reactor vessel, as is commonly done to firmly hold the electrode in position. In this instance, the operation of the reactor at elevated temperatures causes the electrode to expand and deform since it is constrained and prevented from moving at both ends.

Accordingly, an alternative intermediate transmission structure for coupling a waveguide to a pressurized applicator is desired.

SUMMARY OF THE INVENTION

According to example aspects, a microwave mode converter is disclosed that may provide an efficient transfer of energy from a waveguide into a closed applicator vessel such that the applicator vessel may be operated at high pressure and temperature and be securely (pressure) isolated from the waveguide. In example embodiments, the microwave mode converter provides an intermediate transmission structure between a waveguide and a closed applicator vessel that can mitigate the thermal expansion and sealing challenges presented in such environments.

According to a first example aspect is a microwave mode coupling device for transferring electromagnetic (EM) energy from a first structure to a second structure while providing a pressure barrier between the first structure and the second structure, the coupling device comprising first and second transmission line sections separated by an intermediate waveguide section.

According to a further example aspect is a system comprising a first waveguide structure configured to propagate transverse electric (TE) mode microwaves; an applicator vessel configured to operate under positive pressure; and a microwave mode coupling device for transferring electromagnetic (EM) energy from the first waveguide structure to the applicator vessel while providing a pressure barrier between the first waveguide structure and the applicator vessel, the coupling device comprising first and second transmission line sections separated by an intermediate waveguide section.

According to a further example aspect is a method of effecting a transfer of electromagnetic energy (EM) from a first structure to a second structure, comprising: transmitting EM energy received from the first structure through a first transmission line section of a coupling device using transverse electromagnetic (TEM) mode waves; transmitting EM energy received from the first transmission section line through an intermediate waveguide section of the coupling device using transverse magnetic (TM) mode waves; transmitting EM energy received from the intermediate waveguide section through a second transmission line of the coupling device using transverse electromagnetic (TEM) mode waves, and applying the EM energy transmitted through the second transmission line to the second structure; and providing a pressure barrier between the first structure and the second structure in the intermediate waveguide section, through which the TM mode waves pass.

BRIEF DESCRIPTION OF THE DRAWINGS

Reference will now be made, by way of example, to the accompanying drawings which show example embodiments of the present application, and in which.

Similar reference numerals may have been used in the detail description of the different figures to denote similar components.

DETAIL DESCRIPTION OF EXAMPLE EMBODIMENTS

Figure 1:
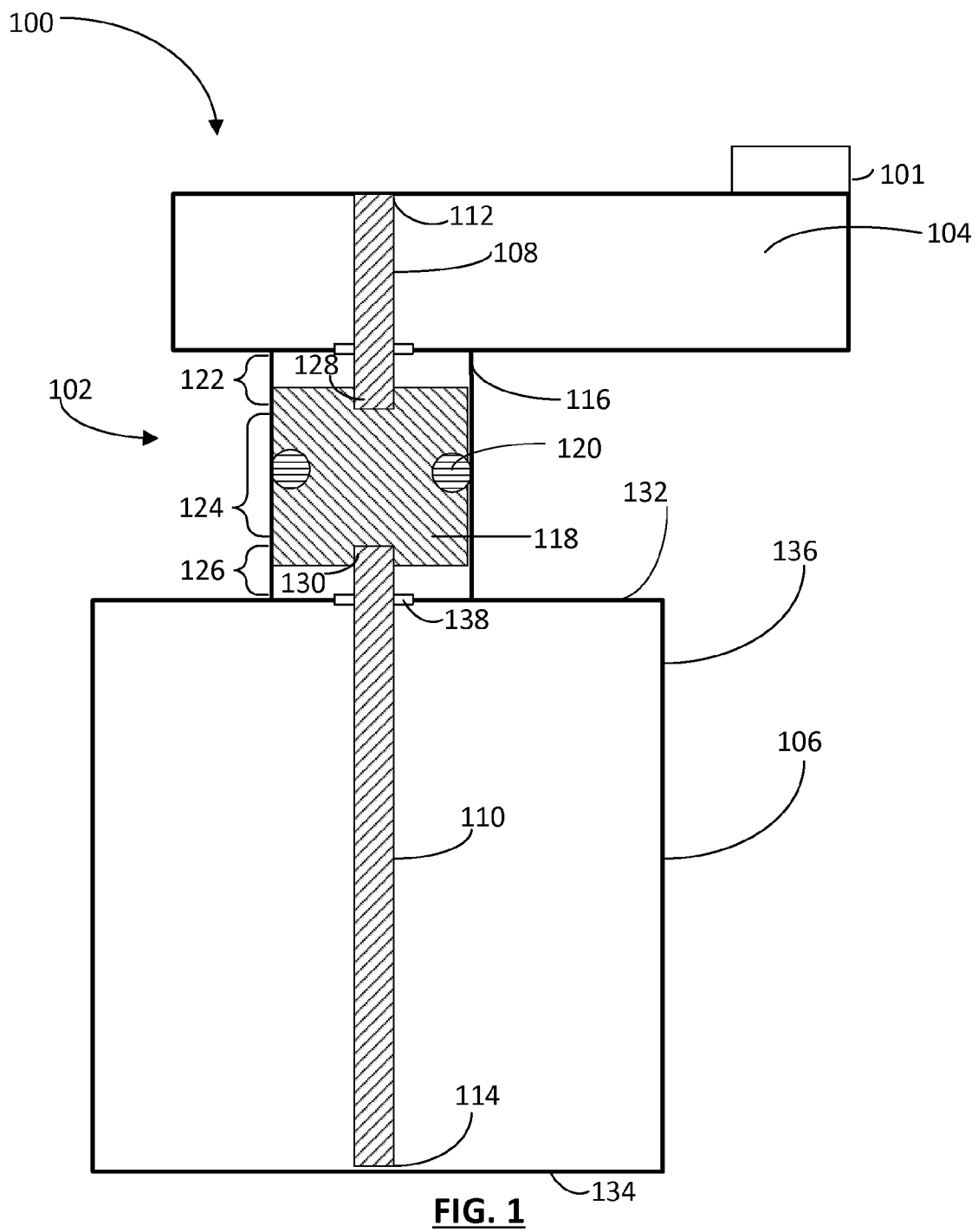
FIG. 1 is a schematic representation showing a sectional front elevation of a waveguide and applicator vessel joined by an microwave mode converter coupling device, according to an example embodiment.

FIG. 1 shows a system 100 according to an example embodiment of this disclosure. System 100 comprises a rectangular waveguide 104 that is joined to a cylindrical applicator vessel 106 by a microwave mode converter (MMC) coupling device 102.

During operation of system 100, microwave energy from a microwave energy source 101, for example a magnetron microwave generator, is introduced to the waveguide 104. Microwave energy is conveyed from the waveguide 104 to the MMC coupling device 102 by a first electrode 108 that extends into the waveguide 104. The microwave energy is then conveyed from the MMC coupling device 102 to cylindrical applicator vessel 106 by a second electrode 110 that is axially aligned with and physically spaced apart from the first electrode 108 and that extends coaxially into the cylindrical applicator vessel 106. The MMC coupling device 102 cooperates with each of the waveguide 104 and applicator vessel 106 to functions as a microwave energy transfer mechanism between the waveguide 104 and the applicator vessel 106, and also to provide a material and pressure barrier between the waveguide 104 and the applicator vessel 106.

The applicator vessel 106 is defined by a conductive circumferential vessel wall 136 that extends between conductive first and second vessel ends 132, 134. In example embodiments, second electrode 110 extends through a central opening in the first vessel end 132, and coaxially with vessel wall 136, to the second vessel end 134. One terminal end 114 of the second electrode 110 may be fixed to the second vessel end 134. In example embodiments, a heat resistant electrical isolator 138 may be located between the second electrode 110 and the first vessel end 132.

Figure 2:
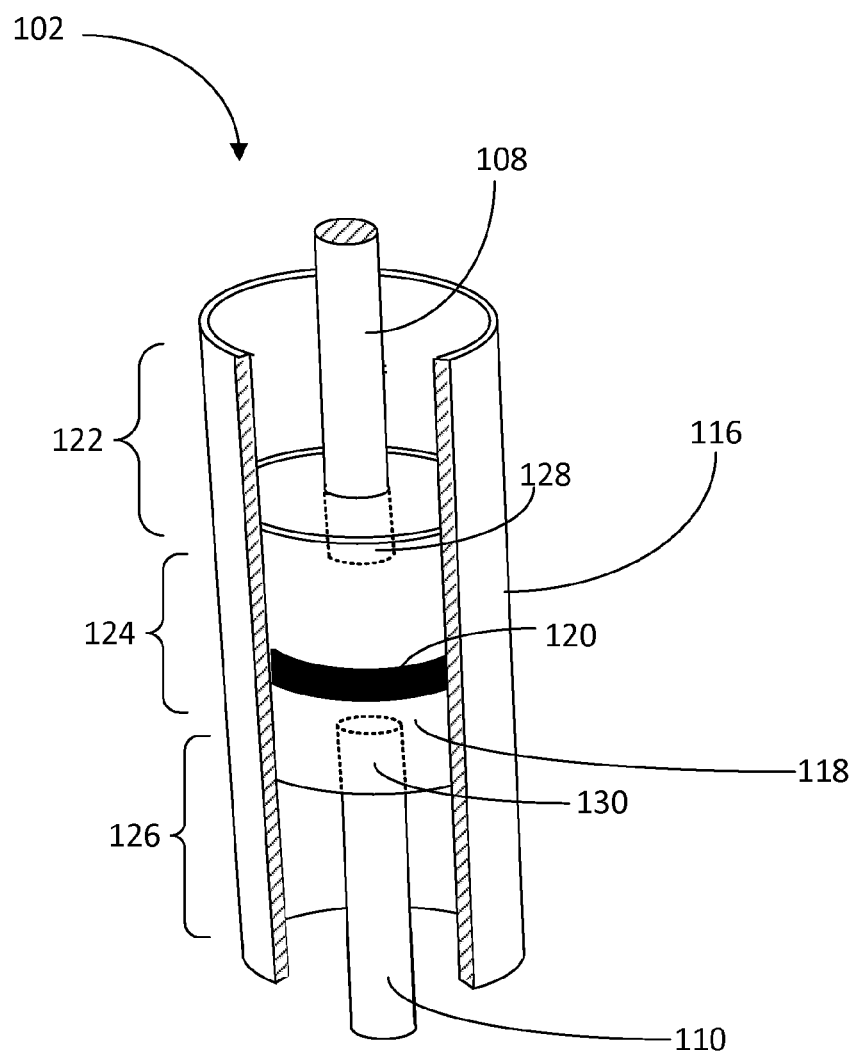
FIG. 2 is a partial sectional view showing the microwave mode converter coupling device of FIG. 1.

In example embodiments, the MMC coupling device 102, which is shown in greater detail in FIG. 2, includes a conductive, cylindrical, housing 116 that houses a central dielectric element 118 that provides a material and pressure barrier between the opposite ends of the conductive housing 116. A circumferential seal 120, which may for example be a resilient O-ring, can be provided between the dielectric element 118 and an inner surface of the conductive housing 116. A portion of the first electrode 108 extends coaxially in the housing 116 from the waveguide 104 and partially into a first end of the dielectric element 118, with a terminal end portion 128 coaxially protruding into a hole provided into a first end of the dielectric element 118. A portion of the second electrode 110 extends coaxially within the housing 116, having a terminal end 130 coaxially protruding into a hole in a second, opposite end, of the dielectric element 118. As indicated above, the first electrode terminal end 128 and second electrode terminal end 130 are coaxially aligned and physically spaced apart from each other by the material of dielectric element 116. In example embodiments, the vessel wall 136 is electrically connected to the housing 116 of the MMC coupling device 102. For example, the first vessel end 132 may be electrically connected to each of the vessel wall 136 and the MMC coupling device housing 116.

The cylindrical housing 116, first electrode 108, dielectric element 118, and second electrode 110 are configured to provide first, second and third microwave transmission sections 122, 124 and 126. First and third microwave transmission sections 122 and 126 are configured to propagate transverse electromagnetic (TEM) mode microwaves. Intervening second microwave transmission section 124 is configured to propagate non-TEM transverse magnetic (TM) mode microwaves. In this regard, in an example embodiment, first microwave transmission section 122, the cylindrical housing 116 and first electrode 108 collectively form a first TEM microwave mode coaxial transmission line that terminates at the end 128 of the first electrode. In second microwave transmission section 124, the cylindrical housing 116 and dielectric element 118 collectively form a TM mode microwave waveguide. In third microwave transmission section 122, the cylindrical housing 116 and second electrode 110 collectively form a second TEM mode microwave coaxial transmission line that commences at the terminal end 130 of the second electrode 110.

During operation as shown, for example, in FIG. 1, waveguide 104 propagates transverse electric (TE) mode microwaves (for example $TE_{10}$ mode microwaves) that are generated by microwave source 101. The TE mode microwaves energize the portion of first electrode 108 that is located within waveguide 104 with microwave energy that is transformed to transverse electromagnetic (TEM) mode microwaves that are propagated by the coaxial transmission line formed by the first microwave transmission section 122 of the MMC coupling device 102. The TEM mode microwaves are transformed into transverse magnetic (TM) mode microwaves (e.g., $TM_{01}$ mode) at the terminal end 128 of the first electrode 108, and these TM mode microwaves are propagated by the waveguide that is formed by the second microwave transmission section 124 of the MMC coupling device 102. These TM mode microwaves are transformed again into TEM mode microwaves at the terminal end 130 of the second conductor 110, and propagated as TEM mode microwaves by the coaxial transmission line formed by the third microwave transmission section 126 of the MMC coupling device 102.

The portion of electrode 110 that extends within applicator vessel 106 forms a further coaxial transmission line with the circumferential vessel wall 136 providing an outer conductive shield. In example embodiments, vessel 106 also function as a waveguide structure, with EM waves propagating within applicator vessel 106 between the electrode 110 and circumferential vessel wall 136. Such microwaves are used to apply energy to a medium located inside the applicator vessel 106 to cause a catalyst reaction. In example embodiments, applicator vessel 106 operates as a reactor containment vessel that operates under substantial positive pressure relative to the waveguide 104.

Accordingly, MMC coupling device 102 relies on the ability of a circular cylinder to operate in both TEM transmission line and TM waveguide modes. In MMC coupling device 102, the microwave energy in the TEM mode is converted into the $TM_{01}$ waveguide mode and back again into the TEM mode, enabling the use of an electrode structure that is discontinued throughout the length of the dielectric element 118.

As noted above, when a continuous electrode structure that extends through the dielectric element is used as a coupling mechanism, then a discrete seal is required between the dielectric barrier and the central electrode. However, the use of a non-continuous axial electrode structure MMC coupling device 102 removes the need to provide a seal between the electrode structure (i.e. electrodes 108 and 110) and the dielectric element 118 since the dielectric material is, itself, selected to be effectively impermeable to gas and solid particles. In example embodiments, the dielectric material used for dielectric element 118 may be selected to be a ceramic (or similar) material which is tolerant to high temperatures and pressures, has very low thermal conductivity and also exhibits low electrical losses at microwave frequencies being used.

In example embodiments, the material used for dielectric element 118, as well as the dimensions of the dielectric element 118 and the surrounding cylindrical housing 116, are selected to ensure that the waveguide that is formed by the second microwave transmission section 124 of the MMC coupling device 102 will have a cutoff frequency-range that is outside the intended operating frequency of system 100. The dimensions of waveguide 104, first and second electrodes 108 and 112, and applicator vessel 106 are selected to optimize energy transfer with matching impedances at each of the mode transformation interfaces throughout the system 100.

In example embodiment, the seal 120 may be implemented using one or more O-rings. The dielectric material of dielectric element 118 provides a high degree of thermal isolation between the first and second electrodes 108, 110 and the seal 120. In applications where additional thermal protection is required for the seal 120, the cylindrical housing 116 can be water or air cooled.

Figure 3:
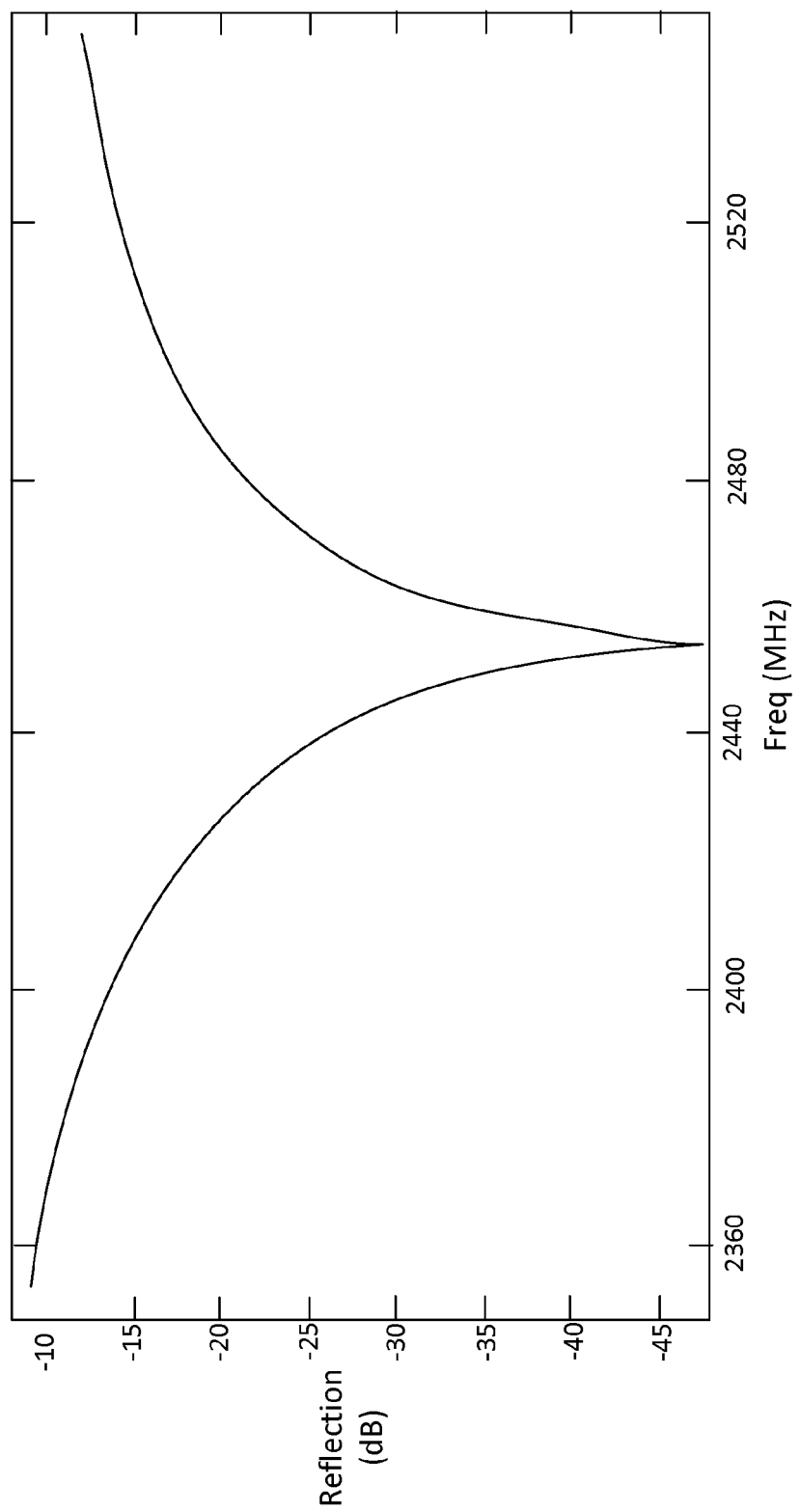
FIG. 3 is an illustrative plot of EM wave reflection v. operating frequency for a dielectric element of the microwave mode converter coupling device of FIG. 1.

An illustrative, non-limiting example of a possible system 100 such as shown in FIG. 1, is as follows: Waveguide 104 is connected to a cylindrical applicator vessel 106 using an axial central electrode structure that comprises first electrode 108 and second electrode 110. The first electrode 108, which extends through the waveguide 104, has a first end 112 located at a top wall of the waveguide 104, and an opposite end 128 embedded in one side of dielectric element 118 of the MMC coupling device 102. The second electrode, which extends through the applicator vessel 106, has a first end 130 embedded in an opposite side of the dielectric element 118 of the MMC coupling device 102, and a second end 114 connected to a bottom plate defined by the second vessel end 134 of the applicator vessel 106. The first and second electrodes 108, 110 are co-axial with cylindrical housing 116 and each have a diameter of 0.5 inches. The dielectric material that forms cylindrical dielectric element 118 has a relative permittivity $\varepsilon_r=9.8$ and the dielectric element 118 has a diameter of 2 inches. In the case of an operating frequency of 2.45 GHz, the corresponding calculated $TM_{01}$ mode cutoff diameter is 1.2 inches, well below the 2 inch diameter of the cylindrical dielectric element 118. Accordingly, in examples embodiments, the dielectric material is selected to have a dielectric constant (relative permittivity) sufficiently high as to allow a predetermined diameter cylindrical conductive housing 116 of the MMC coupling device 102 to support at least the first transverse magnetic mode (e.g., $TM_{01}$ mode) microwaves. The dielectric element has an axial length of 2.76 inches, selected to produce near-cancellation of the two separate discontinuities between the electrodes 108, 110 and the dielectric element 118, resulting in an overall electromagnetic wave reflection of approximately −40 dB at the operating frequency of 2.450 GHz (illustrated in FIG. 3, which shows an illustrative plot of EM wave reflection in dB vs. operating frequency in GHz for a dielectric element of the microwave mode converter coupling device of FIG. 1). Accordingly, in example embodiments, the dielectric material axial length is selected so as to mitigate against the overall electromagnetic wave reflection caused by the presence of dielectric element 118.

As noted above the end 128 of first electrode 108 and the end 130 of second electrode 110 each protrude into holes, which may be shallow holes, at opposite ends of the dielectric element 118. This can provide secure alignment of the electrodes 108 and 110 and improves performance by providing a quarter-wavelength transition between the dielectric material of dielectric element 118 and the respective electrode ends 128, 130.

The operating frequency and corresponding components dimensions and dielectric properties indicated above are illustrative only. The system 100, including MMC coupling device 102, can be configured to provide optimized performance at different intended operating frequencies. In various examples, different systems 100 may be configured to operate at operating frequencies within the microwave frequency range of 300 MHz to 30 GHz. In example embodiments, the frequency of operation is selected from among the Industrial, Scientific & Medical (ISM) frequency bands. In one example embodiment, a system 100 is configured to operate at approximately 915 MHz, and in a further example embodiment, system 100 is configured to operate at approximately 2450 MHz. As used herein, "approximately" refers to a range of plus or minus 15% of the stated value.

Accordingly, in example embodiments as shown in FIG. 1, MMC coupling device 102 provides a mechanism by which two electromagnetic waveguide structures (e.g., waveguide 104 and applicator vessel 106) may be connected together so as to transfer electromagnetic energy from one waveguide structure to the other waveguide structure and to concurrently effect a pressure barrier between the waveguide structures. The MMC coupling device 102 includes first and second electrically-conductive cylindrical coaxial transmission line sections separated by a waveguide section. In some examples, the MMC coupling device 102 functions as both a pressure barrier and a thermal barrier. The MMC coupling device 102 couples a central non-continuous electrode structure that comprise first and second electrodes 108, 110, with dielectric material of dielectric element 118 interposed between two spaced apart, opposed ends of the electrodes 108, 110. The dielectric material is selected to have a dielectric constant (relative permittivity) sufficiently high as to allow a predetermined diameter cylindrical conductive housing 116 of the MMC coupling device 102 to support at least the first transverse magnetic mode (e.g., $TM_{01}$ mode) microwaves. In example embodiments, the dielectric material is selected from ceramic materials which have very low electromagnetic losses at the frequency of operation. The dielectric material axial length is selected so as to minimize the overall electromagnetic wave reflection caused by the dielectric element 118. In example embodiments, one or more O-ring seals 120 may be inserted between the dielectric material of dielectric element 118 and the cylindrical housing 116 to effect a pressure seal. In some examples, a central, shallow hole is placed in both ends of the dielectric material of dielectric element 118 so as to receive the respective ends 128, 130 of the electrodes 108, 110. In example embodiments, the shallow holes are sufficiently large in both depth and diameter as to allow thermal expansion of the electrodes 108, 110 without causing significant stress to the dielectric material. Accordingly, the electrode ends 128, 130 and the respective holes that they are received in are respectively sized to permit thermal expansion of the electrode ends without damaging structural integrity of the dielectric element 118.

In some example embodiments, the shallow holes are approximately one-quarter wavelength deep at the frequency of operation.

The MMC coupling device 102 as described above with respect to FIGS. 1 and 2 is a probe coupling that employs electrode coupling using two discrete electrodes. As noted above, in addition to electrode coupling techniques, probe coupling also includes loop coupling techniques. Accordingly, in example embodiments, one or both of first and second electrodes may be replaced with conductive loops.

Certain adaptations and modifications of the described embodiments can be made. Therefore, the above discussed embodiments are considered to be illustrative and not restrictive.

What is claimed is:

1. A microwave mode coupling device for transferring electromagnetic (EM) energy from a first structure to a second structure while providing a pressure barrier between the first structure and the second structure, the coupling device comprising first and second transmission line sections separated by an intermediate waveguide section, wherein the device is configured to transfer electromagnetic (EM) energy having an EM wave frequency within the Industrial, Scientific & Medical (ISM) bands.

2. The device of claim 1 including a first electrode extending from the first transmission line section into the first structure, and a second electrode extending from the second transmission line section into the second structure, and a dielectric element is located in the intermediate waveguide section between respective spaced apart ends of the first electrode and the second electrode.

3. The device of claim 2 comprising a conductive cylindrical housing that forms an outer conducive shield associated with the first transmission line section, the intermediate waveguide section and the second transmission line section, a first portion of the conductive cylindrical housing cooperating with the first electrode to provide a first coaxial transmission line forming the first transmission line section, a second portion of the conductive cylindrical housing cooperating with the dielectric element to form a cylindrical waveguide forming the intermediate waveguide section, and a third portion of the conductive cylindrical housing cooperating with the second electrode to provide a second coaxial transmission line forming the second transmission line section.

4. The device of claim 3 comprising at least one O-ring seal between a surface of the cylindrical housing and a surface of the dielectric element to effect a pressure seal therebetween.

5. The device of claim 3 wherein the dielectric element is formed from a heat resistant ceramic material having a relative permittivity that enables the conductive cylindrical housing of a predefined diameter to support propagation of at least a $TM_{01}$ mode wave.

6. The device of claim 3 wherein an axial length of the dielectric element is selected to mitigate EM wave reflections caused by presence of the dielectric element.

7. The device of claim 3 wherein an end of the first electrode extends into a first hole formed in a first end of the dielectric element, and an end of the second electrode extends into a second hole formed in a second end of the dielectric element.

8. The device of claim 7 wherein the first and second holes and first and second electrode ends are respectively sized to enable thermal expansion of the electrode ends without damaging structural integrity of the dielectric element.

9. The device of claim 7 wherein the first and second holes and first and second electrode ends are respectively sized such that the first and second electrode ends each extend a depth into the dielectric element of approximately one-quarter wavelength of an intended frequency of operation.

10. The device of claim 1 wherein the device is configured to transfer electromagnetic (EM) energy having an EM wave frequency of one of approximately 915 MHz or approximately 2450 MHz.

11. A system comprising:
a first waveguide structure configured to propagate transverse electric (TE) mode microwaves;
an applicator vessel configured to operate under positive pressure;
a microwave mode coupling device providing a pressure barrier between the first waveguide structure and the applicator vessel, the coupling device comprising first and second transmission line sections separated by an intermediate waveguide section, wherein a first electrode extends from the first transmission line section into the first waveguide structure, and a second electrode extends from the second transmission line section into the applicator vessel, and a dielectric element is located in the intermediate waveguide section between respective spaced apart and opposing ends of the first electrode and the second electrode, the dielectric element providing the pressure barrier between the first waveguide structure and the applicator vessel, wherein the first transmission line section is configured to transmit EM energy received from the first waveguide structure as transverse electromagnetic (TEM) mode waves, the intermediate waveguide section is configured to transfer EM energy received from the first transmission line section using transverse magnetic (TM) mode waves, and the second transmission line section is configured to transmit EM energy received from the intermediate waveguide section to the applicator vessel using (TEM) mode waves.

12. A method of effecting a transfer of electromagnetic (EM) energy from a first structure to a second structure, comprising:
transmitting EM energy received from the first structure through a first transmission line section of a coupling device using transverse electromagnetic (TEM) mode waves;
transmitting EM energy received from the first transmission section line through an intermediate waveguide section of the coupling device using transverse magnetic (TM) mode waves;
transmitting EM energy received from the intermediate waveguide section through a second transmission line section of the coupling device using transverse electromagnetic (TEM) mode waves,
applying the EM energy transmitted through the second transmission line section to the second structure; and
providing a pressure barrier between the first structure and the second structure in the intermediate waveguide section, through which the TM mode waves pass.

13. The method of claim 12 wherein the second structure is an applicator vessel that is maintained at a higher pressure than the first structure and houses.

14. The method of claim 12 wherein a first electrode extends from the first transmission line section into the first structure, and a second electrode extends from the second transmission line section into the second structure, and providing the pressure barrier comprises providing a dielectric element between respective spaced apart opposed ends of the first electrode and the second electrode.

15. The method of claim 14 wherein the dielectric element is formed from a heat resistant ceramic material having a relative permittivity that enables the conductive cylindrical housing of a predefined diameter to support propagation of at least a $TM_{01}$ mode wave.

16. The method of claim 14 wherein providing the dielectric element comprises configuring the dielectric element with an axial length to mitigate EM wave reflections caused by the presence of the dielectric element.

17. The method of claim 14 comprising providing a conductive cylindrical housing that forms an outer conducive shield of the first transmission line section, the intermediate waveguide section and the second transmission line section,
a first portion of the conductive cylindrical housing cooperating with the first electrode to provide a first coaxial transmission line forming the first transmission line section, a second portion of cylindrical housing cooperating with the dielectric element to form a cylindrical waveguide forming the intermediate waveguide section, and a third portion of the conductive cylindrical housing cooperating with the second electrode to provide a second coaxial transmission line forming the second transmission line section.

18. The method of claim 17 wherein providing the pressure barrier comprises providing at least one O-ring seal between a surface of the cylindrical housing and a surface of the dielectric element to effect a pressure seal therebetween.

\* \* \* \* \*